(12) United States Patent
Holme et al.

(10) Patent No.: US 6,725,541 B1
(45) Date of Patent: Apr. 27, 2004

(54) FLOW DIRECTING ELEMENT AND A METHOD OF MANUFACTURING A FLOW DIRECTING ELEMENT

(75) Inventors: Michael J Holme, Burton on Trent (GB); Jeffrey C Bishop, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/396,480

(22) Filed: Mar. 26, 2003

Related U.S. Application Data

(62) Division of application No. 09/760,809, filed on Jan. 17, 2001, now Pat. No. 6,557,338.

(30) Foreign Application Priority Data

Jan. 21, 2000 (GB) .............................................. 0001279

(51) Int. Cl.⁷ .......................... B21K 25/00; B23P 15/04
(52) U.S. Cl. ................ 29/889.21; 29/889.2; 29/889.22; 29/890.01
(58) Field of Search .......................... 29/889.2, 889.21, 29/889.22, 890.01, 897.15, 897.2, 433; 60/226.2, 230; 239/265.29, 265.31; 244/110 B; 428/596

(56) References Cited

U.S. PATENT DOCUMENTS

| | | | | |
|---|---|---|---|---|
| 2,333,343 A | * | 11/1943 | Sendzimir .................... | 228/118 |
| 2,945,346 A | * | 7/1960 | Arnzen ................... | 239/265.29 |
| 2,951,660 A | * | 9/1960 | Giliberty ................... | 244/23 R |
| RE27,094 E | * | 3/1971 | Rosaen et al. ................ | 29/445 |
| 3,568,931 A | * | 3/1971 | Mortlock et al. ...... | 239/265.31 |
| 3,570,767 A | * | 3/1971 | Lawson et al. ........ | 239/265.29 |
| 3,601,992 A | * | 8/1971 | Maison ...................... | 60/226.2 |
| 4,026,105 A | * | 5/1977 | James ........................ | 60/226.2 |
| 4,030,290 A | | 6/1977 | Stachowiak | |
| 4,067,094 A | * | 1/1978 | Ittner ....................... | 29/889.22 |
| 4,173,307 A | * | 11/1979 | Ittner .................... | 239/265.29 |
| 4,497,753 A | | 2/1985 | Streiff | |
| 4,596,621 A | * | 6/1986 | Nawaz ........................ | 156/245 |
| 4,778,110 A | * | 10/1988 | Sankey et al. ........ | 239/265.29 |
| 4,852,805 A | * | 8/1989 | Vermilye ................ | 239/265.11 |
| 4,960,243 A | * | 10/1990 | Dubois et al. ......... | 239/265.29 |
| 4,975,334 A | * | 12/1990 | Bullivant-Clark ........... | 428/593 |
| 5,045,403 A | | 9/1991 | Maus | |
| 5,507,143 A | * | 4/1996 | Luttgeharm et al. ....... | 60/226.2 |
| 5,552,123 A | | 9/1996 | Numoto | |
| 6,557,338 B2 | * | 5/2003 | Holme et al. .............. | 60/226.2 |

FOREIGN PATENT DOCUMENTS

| | | |
|---|---|---|
| EP | 0 454 179 A | 10/1991 |
| EP | 0 757 221 A | 2/1997 |

* cited by examiner

*Primary Examiner*—Essama Omgba
(74) *Attorney, Agent, or Firm*—W. Warren Taltavull; Manelli Denison & Selter PLLC

(57) ABSTRACT

A thrust reverser cascade flow directing element (28) for a gas turbine engine (10) comprises a plurality of plates (30) and a plurality of flow directing vanes (40). At least one vane (40) extends between each pair of plates (30), the plurality of plates (30) are formed from sheet material and a single integral piece of ductile sheet material (32) forms the plurality of flow directing vanes (40). The single integral piece of ductile sheet material (32) has a plurality of longitudinally spaced apart apertures (36) and a plurality of longitudinally spaced apart sheet material portions (38) between the apertures (36) and the ductile sheet material (32) is bent at a plurality of longitudinally spaced positions such that each sheet material portion (38) defines one of the plurality of flow directing vanes (40).

17 Claims, 4 Drawing Sheets

FLOW DIRECTING ELEMENT AND A METHOD OF MANUFACTURING A FLOW DIRECTING ELEMENT

This is a Divisional of: National application No. 09/760,809 filed Jan. 17, 2001, now U.S. Pat. No. 6,557,338.

FIELD OF THE INVENTION

The present invention relates to a flow director, for example a thrust reverser cascade for a gas turbine engine, and in particular relates to a flow directing element, for example a thrust reverser cascade element for a turbofan gas turbine engine.

BACKGROUND OF THE INVENTION

A thrust reverser cascade element generally comprises at least two plates and a plurality of flow directing vanes. A plurality of vanes extend between each pair of plates.

It is known to manufacture thrust reverser cascade elements for turbofan gas turbine engines by casting the thrust reverser cascade elements from molten aluminium or molten magnesium. This method requires the use of a mould for each thrust reverser cascade element, and each thrust reverser cascade may comprise a number of different thrust reverser elements requiring different moulds. Thus the casting of thrust reverser cascade elements is expensive and time consuming in the requirement to make the different moulds and in heating the metal to melting point and subsequently casting the molten metal.

It is also known to manufacture thrust reverser cascade elements for turbofan gas turbine engines by moulding and curing the thrust reverser elements from composite structures, for example carbon fibre reinforced resins. This method also requires the use of a mould for each thrust reverser cascade element, and each thrust reverser cascade may comprise a number of different thrust reverser elements requiring different moulds. Thus the moulding and curing of thrust reverser cascade elements is expensive and time consuming in the requirement to make the different moulds and in heating the resins to cure the resin and consolidate the carbon fibre and resins to the appropriate density and shape. The thrust reverser cascade elements comprising composite structures do not have sufficient strength.

U.S. Pat. No. 4,030,299 discloses the manufacture of a thrust reverser cascade for gas turbine engines by securing together sheet metal vanes and sheet metal plates, for example aluminium or titanium. Each of the vanes is formed from a separate piece of sheet metal.

Published European patent application EP0219889A discloses the manufacture of a thrust reverser cascade for gas turbine engines by producing a metallic skeletal frame and moulding/curing a composite structure, for example carbon fibre reinforced nylon around the metallic skeletal frame.

SUMMARY OF THE INVENTION

Accordingly the present invention seeks to provide a novel flow directing element which reduces, preferably overcomes, the above mentioned problems.

Accordingly the present invention provides a flow directing element comprising a plurality of plates and a plurality of flow directing vanes, at least one vane extends between each pair of plates, the plurality of plates are formed from sheet material and a single integral piece of ductile sheet material forms the plurality of flow directing vanes, the single integral piece of ductile sheet material has a plurality of spaced apart apertures and a plurality of sheet material portions, each sheet material portion defines one of the plurality of flow directing vanes.

Preferably a plurality of vanes extend between each pair of plates.

Preferably the single integral piece of ductile sheet material has a plurality of longitudinally spaced apart apertures and a plurality of longitudinally spaced apart sheet material portions between the apertures and the ductile sheet material is bent at a plurality of longitudinally spaced positions such that each sheet material portion defines one of the plurality of flow directing vanes.

Preferably the single integral piece of ductile sheet material has a plurality of transversely spaced apart apertures, a plurality of transversely spaced apart sheet material portions, a plurality of longitudinally extending slots between the transversely spaced apart sheet material portions and a plurality of transversely extending webs longitudinally between the slots, the webs extending over at least one of the plurality of plates and the ductile sheet material is bent at a plurality of longitudinally spaced positions such that each sheet material portion defines one of the plurality of flow directing vanes.

Preferably the plates have a plurality of slots on one of their edges and the webs locate in the slots in the edges of the plates.

Preferably the plates have a plurality of longitudinally spaced apart apertures extending therethrough, each longitudinally extending slot in the ductile sheet material has projections on its edges which locate in a corresponding one of the apertures in one of the plates.

Preferably each longitudinally extending edge of the single integral piece of ductile sheet material has at least one twist lock, each twist lock locates in an aperture in one of the plurality of plates.

Preferably each longitudinally extending edge of the single integral piece of ductile sheet material has a plurality of longitudinally spaced twist locks, each twist lock locates in a corresponding aperture in one of a plurality of longitudinally spaced apertures in one of the plurality of plates.

Preferably a pair of end plates extend transversely to the plurality of plates and the single integral piece of ductile sheet material.

Preferably each transversely extending end of the single integral piece of ductile sheet material has at least one twist lock, each twist lock locates in an aperture in one of the end plates.

Preferably each transversely extending end of the single integral piece of ductile sheet material has a plurality of twist locks, each twist lock locates in a corresponding one of a plurality of apertures in one of the end plates.

Preferably each transversely extending end of each plate has at least one twist lock, each twist lock locates in an aperture in one of the end plates.

Preferably each transversely extending end of each plate has a plurality of twist locks, each twist lock locates in a corresponding one of a plurality of apertures in one of the end plates.

Preferably the single integral piece of ductile sheet material comprises a metal, more preferably the single integral piece of ductile sheet material comprises aluminium, titanium, mild steel or stainless steel.

Preferably the plates comprise a metal, more preferably the plates comprise aluminium, titanium, mild steel or stainless steel.

Preferably the end plates comprise a metal, more preferably the end plates comprise aluminium, titanium, mild steel or stainless steel.

Preferably the flow directing element comprises a thrust reverser cascade element. Preferably a gas turbine engine thrust reverser comprises one or more thrust reverser cascade elements.

The present invention also provides a method of manufacturing a flow directing element comprising the steps of:

(a) forming a plurality of plates, the plurality of plates are formed from sheet material, (b) forming a single integral piece of ductile sheet material such as to form a plurality of flow directing vanes, forming a plurality of spaced apart apertures and a plurality of sheet material portions, (c) arranging the single integral piece of ductile sheet material such that at least one vane extends between each pair of plates and each sheet material portion defines one of the plurality of flow directing vanes.

Preferably step (c) comprises arranging the single integral piece of ductile sheet material such that a plurality of vanes extend between each pair of plates.

Preferably step (b) comprises forming a plurality of longitudinally spaced apart apertures in the single integral piece of ductile sheet material and forming a plurality of longitudinally spaced apart sheet material portions between the apertures and bending the ductile sheet material at a plurality of longitudinally spaced positions such that each sheet material portion defines one of the plurality of flow directing vanes.

Preferably step (b) comprises forming a plurality of transversely spaced apart apertures in the single integral piece of ductile sheet material, forming a plurality of transversely spaced apart sheet material portions, forming a plurality of longitudinally extending slots between the transversely spaced apart sheet material portions and forming a plurality of transversely extending webs longitudinally between the slots, bending the ductile sheet material at a plurality of longitudinally spaced positions such that each sheet material portion defines one of the plurality of flow directing vanes and step (c) comprises arranging the webs such that they extend over at least one of the plurality of plates.

Preferably step (c) comprises forming a plurality of slots in one of the edges of the plates and locating each web in a corresponding one of the slots in the edges of the plates.

Preferably step (a) comprises forming a plurality of longitudinally spaced apart apertures through the plates, step (b) comprises forming projections on the edges of each longitudinally extending slot in the ductile sheet material and step (c) comprises locating the projections in a corresponding one of the apertures in one of the plates.

Preferably step (b) comprises forming at least one twist lock on each longitudinally extending edge of the single integral piece of ductile sheet material and step (c) comprises locating each twist lock in an aperture in one of the plurality of plates.

Preferably step (b) comprises forming a plurality of longitudinally spaced twist locks on each longitudinally extending edge of the single integral piece of ductile sheet material and step (c) comprises locating each twist lock in a corresponding aperture in one of the plurality of longitudinally spaced apertures in one of the plurality of plates.

Preferably there are additional steps (d) forming a pair of end plates and step (e) arranging the end plates to extend transversely to the plurality of plates and the single integral piece of ductile sheet material.

Preferably step (b) comprises forming at least one twist lock on each transversely extending end of the single integral piece of ductile sheet material, step (d) comprises forming an aperture in one of the end plates and step (e) comprises locating each twist lock in an aperture in one of the end plates.

Preferably step (b) comprises forming a plurality of twist locks on each transversely extending end of the single integral piece of ductile sheet material, step (d) comprises forming a plurality of apertures in one of the end plates and step (e) comprises locating each twist lock in a corresponding one of the plurality of apertures in one of the end plates.

Preferably step (a) comprises forming at least one twist lock on each transversely extending end of each plate, step (d) comprises forming at least one aperture in each of the end plates and step (e) comprises locating each twist lock in an aperture in the end plates.

Preferably step (a) comprises forming a plurality of twist locks on each transversely extending end of each plate, step (d) comprises forming a plurality of apertures in each of the end plates and step (e) comprises locating each twist lock in a corresponding one of the plurality of apertures in the end plates.

Preferably forming the single integral piece of ductile sheet material from a metal, more preferably forming the single integral piece of ductile sheet material from aluminium, titanium, mild steel or stainless steel.

Preferably forming the plates from a metal, more preferably forming the plates from aluminium, titanium, mild steel or stainless steel.

Preferably forming the end plates from a metal, more preferably forming the end plates from aluminium, titanium, mild steel or stainless steel.

Preferably step (b) comprises forming the longitudinally spaced apertures by cutting with a laser beam. Preferably step (b) comprises forming the transversely spaced apertures by cutting with a laser beam. Preferably step (b) comprises forming the longitudinally extending slots by cutting with a laser beam.

Preferably the flow directing element is a thrust reverser cascade element.

DESCRIPTION OF THE DRAWINGS

The present invention will be more fully described by way of example with reference to the accompanying drawings in which:

FIG. 8 is another perspective view of the thrust reverser cascade element according to the present invention similar.

DETAILED DESCRIPTION OF THE INVENTION

Figure 1:
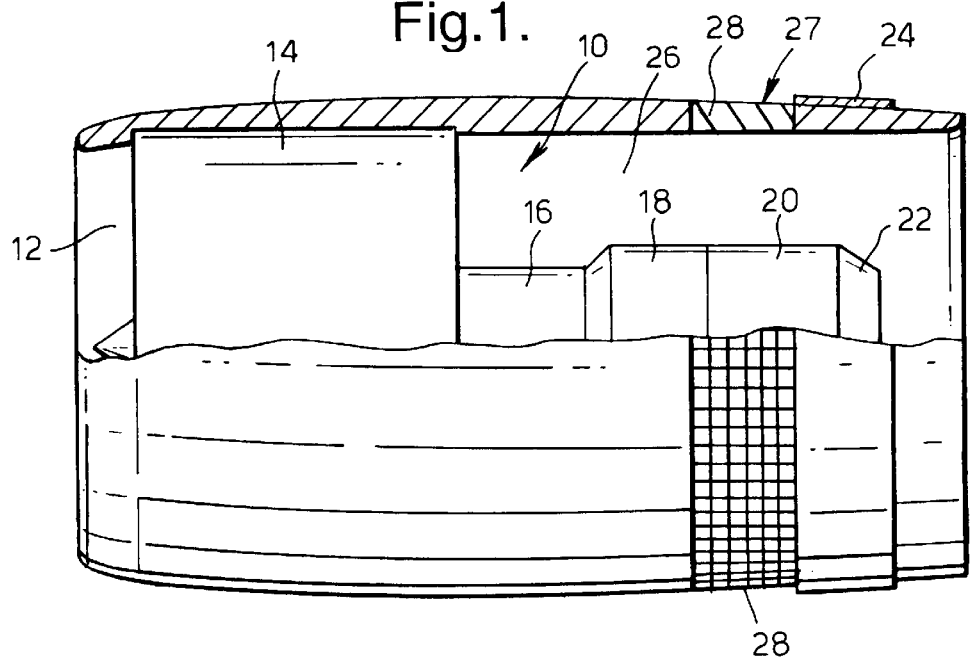
FIG. 1 shows a turbofan gas turbine engine having a thrust reverser comprising a thrust reverser cascade element according to the present invention.
Figure 2:
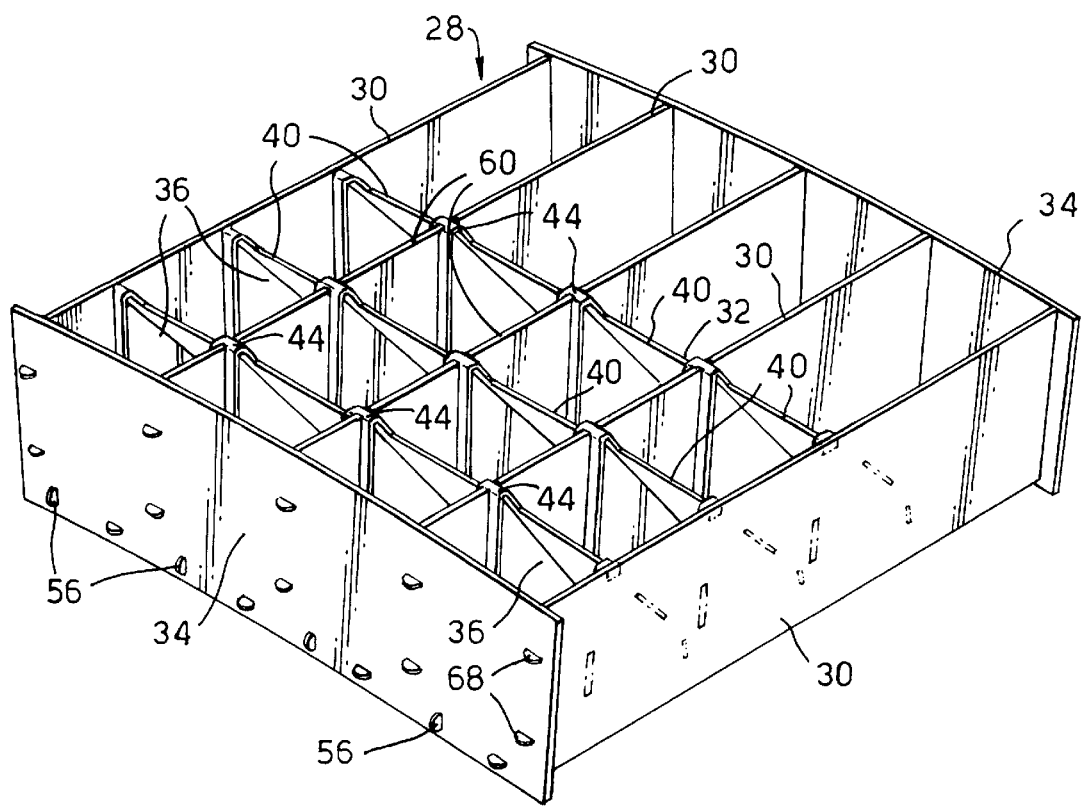
FIG. 2 is an enlarged perspective view of a thrust reverser cascade element according to the present invention.
Figure 3:
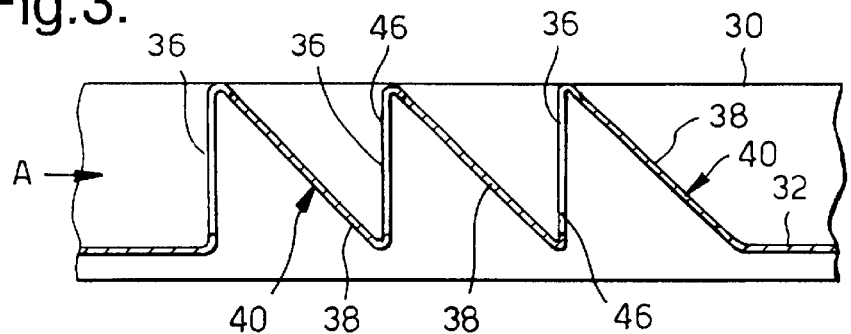
FIG. 3 is a cross-sectional view through the thrust reverser cascade element shown in FIG. 2 in a plane parallel to the longitudinally extending plates.
Figure 4:
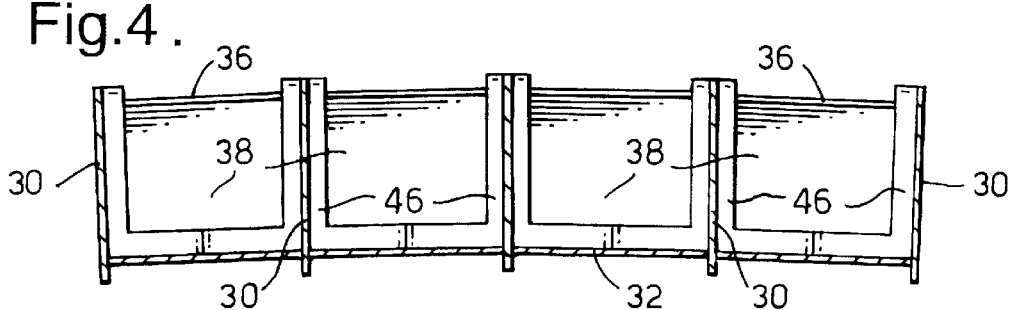
FIG. 4 is a view in the direction of arrow A in FIG. 3.

A turbofan gas turbine engine 10, as shown in FIG. 1, comprises in axial flow series an intake 12, a fan section 14, a compressor section 16, a combustion section 18, a turbine section 20 and a core exhaust 22. The turbine section 20 comprises a low pressure turbine (not shown) arranged to drive a fan (not shown) in the fan section 14 and a high pressure turbine (not shown) arranged to drive a high pressure compressor (not shown) in the compressor section 16. The turbine section 20 may also comprise an intermediate pressure turbine arranged to drive an intermediate pressure compressor in the compressor section 16.

A nacelle 24 is provided around the turbofan gas turbine engine 10 and partially defines a fan duct 26. The nacelle 24 comprises a thrust reverser 27 arranged to direct the gases in the fan duct 26 in an upstream direction to reduce the forward velocity of an aircraft (not shown), to which the turbofan gas turbine engine 10 is mounted, during the landing mode of the aircraft.

The thrust reverser 27 comprises one or more thrust reverser cascade elements 28 and each thrust reverser cascade element 28 forms either a complete circle, or ellipse, or a sector of a circle, or an ellipse.

Each thrust reverser cascade element 28, as shown in FIGS. 2 to 4 and 8, comprises a plurality of parallel longitudinally extending plates 30, a single integral piece of ductile sheet material 32 and a pair of parallel end plates 34. The end plates 32 are arranged to extend substantially transversely and perpendicularly to the longitudinally extending plates 30. A plurality of flow directing vanes 40 are arranged between each pair of parallel longitudinally extending plates 30. The single integral piece of ductile sheet material 32 forms the plurality of flow directing vanes 40 between each pair of parallel longitudinally extending plates 30.

Figure 5:
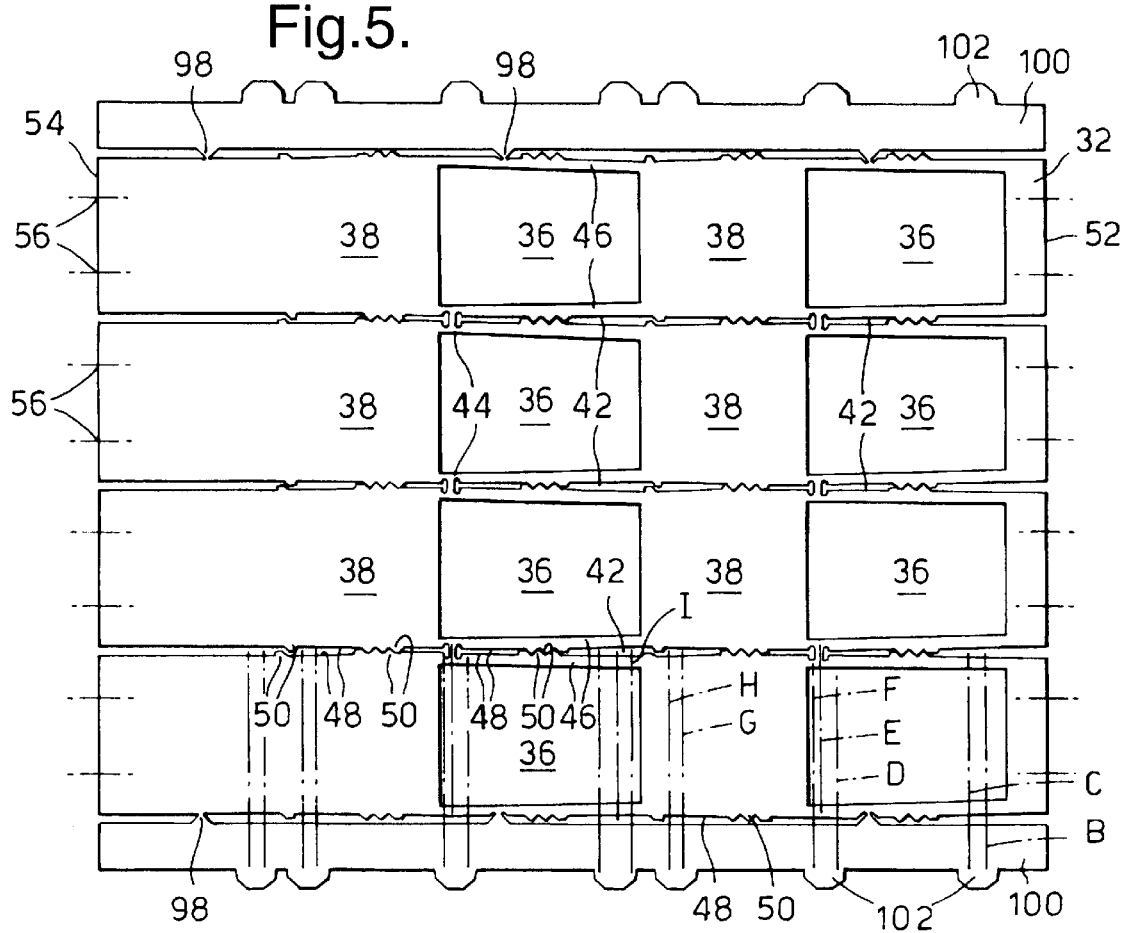
FIG. 5 is an enlarged plan view of a single integral piece of ductile material which forms the vanes of the thrust reverser cascade element.

The single integral piece of ductile sheet material 32, as shown in FIG. 5, is provided with a plurality of longitudinally spaced apart apertures 36 and a plurality of longitudinally spaced apart sheet material portions 38 between the apertures 36. The ductile sheet material 32 is bent in lines B, C, D, E, F, G, H and I at a plurality of longitudinally spaced positions such that each sheet material portion 38 defines one of the plurality of flow directing vanes 40 between each pair of plates 30.

The single integral piece of ductile sheet material 32 is provided with a plurality of transversely spaced apart apertures 36 and plurality of transversely spaced apart sheet material portions 38. A plurality of longitudinally extending slots 42 are provided between the transversely spaced apart sheet material portions 38 and a plurality of transversely extending webs 44 are provided longitudinally between the slots 42. The webs 44 extend over the plurality of plates 30 and the ductile sheet material is bent at the lines B, C, D, E, F, G and H at a plurality of longitudinally spaced positions such that each sheet material portion 38 defines one of the plurality of flow directing vanes 40 in adjacent pairs of plates 30.

The single integral piece of ductile sheet material 32 is provided with a plurality of longitudinally extending strips 46. Each longitudinal side of each aperture 36 has a strip 46 to interconnect the longitudinally spaced apart sheet material portions 38. The webs 44 extend transversely between strips 46 around transversely adjacent apertures 36. The slots 42 are also provided between the transversely adjacent strips 46. The edge 48 of each strip 46 facing an adjacent strip 46 is provided with a plurality of projections 50 which extend towards and interdigitate with the projections 50 on the adjacent strip 46 or extend away from the respective aperture 36.

The longitudinal ends 52 and 54 of the single integral piece of ductile sheet material 32 are provided with at least one twist lock 56, preferably a plurality of twist locks 56, to locate in apertures 70 in the end plates 34 for fastening the ductile sheet material 32 to the end plates 34.

The single integral piece of ductile sheet material 32 also comprises a plurality of lands 98 which reduce in dimension towards the edge of the slot 42 and are recessed into the edges of the slots 42 to aid removal of the surplus material 100. The surplus material 100 is also provided with a plurality of shaped location features 102 which are arranged at predetermined longitudinally spaced positions to enable the single integral piece of ductile material 32 to be accurately located in a press to bend the single integral piece of ductile sheet material 32. The location features coincide with the bend lines B, C, D, E, F, G, H and I. The location features minimise or prevent the cumulative build of tolerances. The location features 102 are breakable and may be removed once the required bend has been produced. The surplus material 100 is removed once all of the single integral piece of ductile material 32 has been bent to the desired shape.

The single integral piece of ductile sheet material preferably comprises a metal, for example aluminium, titanium, stainless steel, mild steel etc.

The apertures 36, slots 42, webs 44, strips 46, projections 50 and twist locks 56 are preferably formed by cutting the single integral piece of ductile material 32 with a laser beam.

Figure 6:
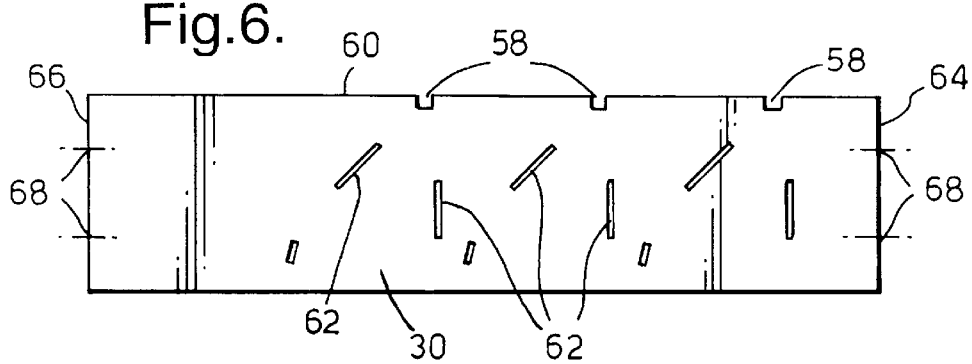
FIG. 6 is an enlarged plan view of a plate which forms a longitudinally extending plate of the thrust reverser cascade element.
Figure 8:
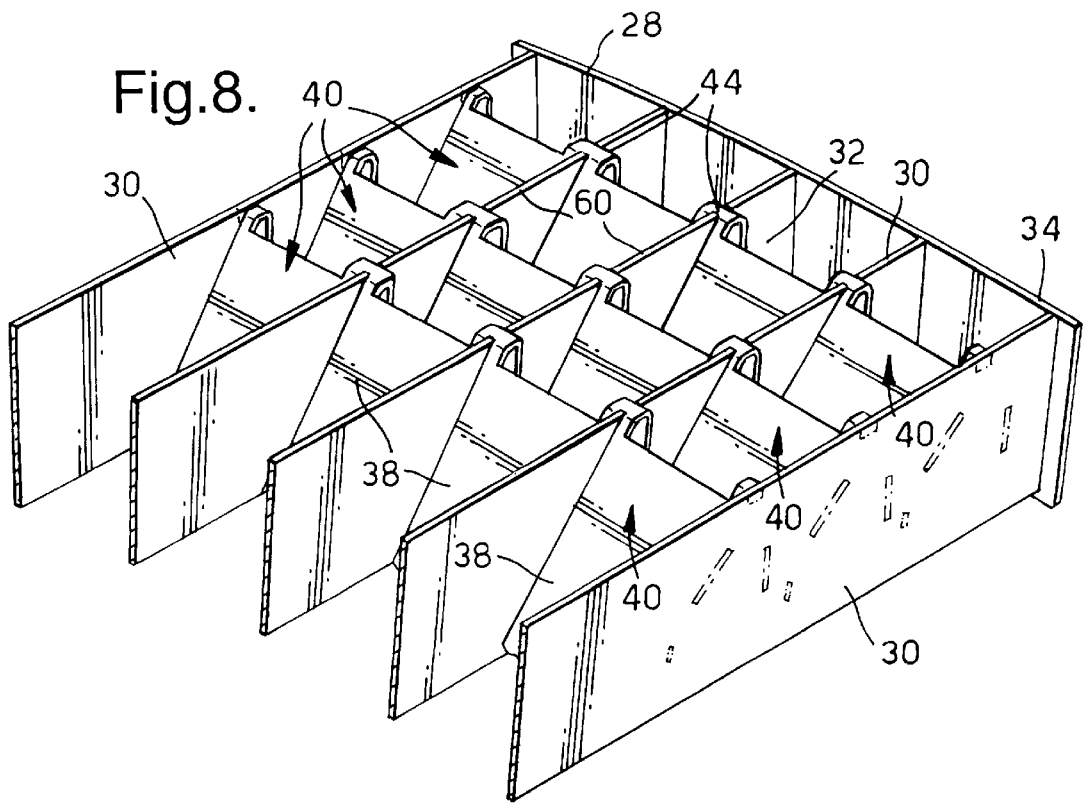

Each of the plates 30, as shown in FIG. 6, has a plurality of longitudinally spaced slots 58 on one of their edges 60 to receive and locate the webs 44 in the slots 58 in the edges 60 of the plates 30. Each of the plates 30 also has a plurality of longitudinally spaced apart apertures 62 extending therethrough. The apertures 62 in the plates 30 are dimensioned and positioned to receive the projections 50 on the strips 46 of the ductile sheet material 32 when the ductile sheet material 32 is in its bent condition as shown in FIG. 8.

The longitudinal ends 64 and 66 of each of the plates 30 has at least one twist lock 68, preferably a plurality of twist locks 68, to locate in apertures 72 in the end plates 34 for fastening the plates 30 to the end plates 34.

The plates 30 are preferably formed from a metal, for example aluminium, titanium, stainless steel, mild steel etc.

The slots 58, apertures 62 and twist locks 68 are preferably formed by cutting the plates 30 with a laser beam.

Figure 7:
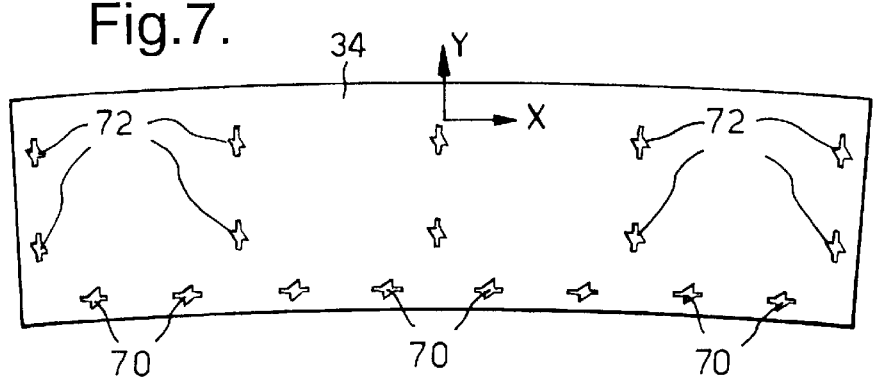
FIG. 7 is an enlarged plan view of a plate which forms an end plate of the thrust reverser cascade element.

Each of the end plates 34, as shown in FIG. 7, is provided with at least one aperture 70, preferably a plurality of apertures 70, to receive the twist locks 56 on the ends of the single integral piece of ductile sheet material 32 and at least one aperture 72, preferably a plurality of apertures 72, to receive the twist locks 68 on the ends of the plates 30.

The end plates 34 are preferably formed from a metal, for example aluminium, titanium, stainless steel, mild steel etc.

The apertures 70 and 72 are preferably formed by cutting the end plates 34 with a laser beam.

Figure 9:
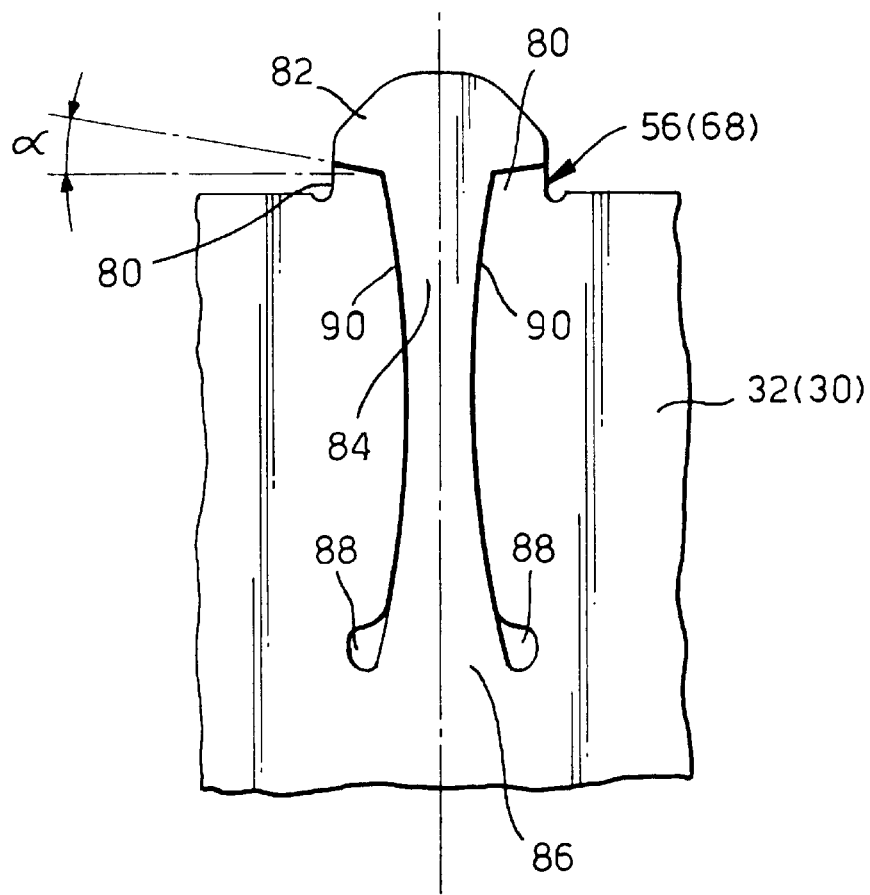
FIG. 9 is an enlarged view of a twist lock on a longitudinally extending plate or the single integral piece of ductile material.

The twist locks 56 and 68 are shown more clearly in FIG. 9 and comprises a projection 82 on the edge of the single integral piece of ductile material 32, or plate 30. The projection 82 is symmetrical and is rotatable about axis X. Two further smaller projections 80, which extend a distance equal to the thickness end plate 34, are provided at opposite sides of the projection 82. The projection 82 has a root 84 which extends between the projections 80 into the single integral piece of ductile material 32, or plate 30, by a predetermined distance where it integrally fixed at region 86. Two apertures 84 are provided for stress relief and a clearance 90 is provided between the projection 82 and the projections 80.

Figure 10:
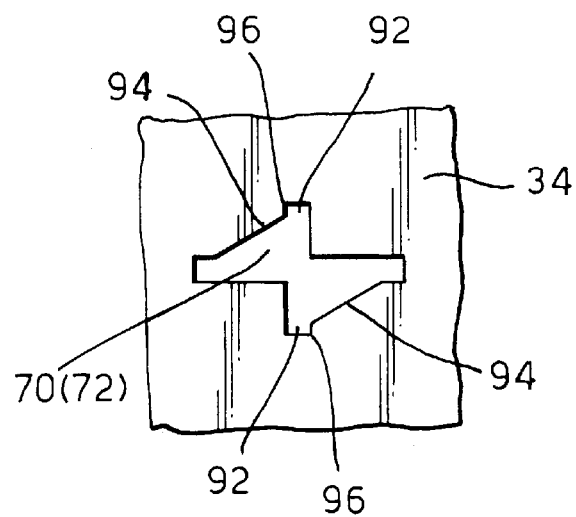
FIG. 10 is an enlarged view of an aperture in an end plate.

The apertures 70 and 72 are shown more clearly in FIG. 10 are rectangular slots and comprise sub slots 92 extending perpendicularly from the centre of the slot. The sub slots 92 have ramps to allow the projection 82 to rotate in the slot 70 or 72 and pawls 96 may be formed at the ends of the sub slots 92 to lock the projection 82 in place.

The twist locks are described more fully in our International patent application PCT/GB99/02128 filed Jul. 2, 1999 claiming priority from UK patent application 9815606.0 filed Jul. 18, 1998.

The thrust reverser cascade element is manufactured by forming the desired number of longitudinally extending plates 30, the single integral piece of ductile sheet material 32 and the end plates 34. The longitudinally extending plates 30 are formed by forming the slots 58, apertures 62 and forming the twist locks 68. This is preferably performed by laser beam machining. The single integral piece of ductile material 32 is formed by forming the apertures 36, slots 42, webs 44, projections 50, twist locks 56, lands 98 and locating features 102. This is preferably performed by laser machining. The end plates 34 are formed by forming the apertures 70 and 72, preferably by laser machining.

Then the single integral piece of ductile sheet material 32 is bent along lines B, C, D, E, F, G, H and I to form the material portions 38 into the vanes 40. The bending of the material portions 38 may be at any suitable angle, although the figures show an angle of approximately 45°.

Then the two surplus portions 100 are removed from the single integral piece of ductile sheet material 32. The single integral piece of ductile sheet material 32 is then bent by flexing of the webs 44 to allow the longitudinally extending plates 30 to be located in each of the slots 42. The single integral piece of ductile sheet material 32 is then restored to its original shape and the webs locate in the slots 58 and the projections 50 locate in the apertures 62. Further longitudinally extending plates 30 are provided at the longitudinal edges of the single integral piece of ductile sheet material 32.

Finally the end plates are arranged at the ends of the longitudinally extending plates 30 and the ends of the single integral piece of ductile sheet material 32. The twist locks 56 and 68 on the single integral piece of ductile sheet material 32 and the longitudinally extending plates 30 respectively locate in the apertures 70 and 72 respectively in the end plates 34 and are twisted to lock the assembly together.

The invention enables thrust reverser cascade element to be a fully mechanically interlocking, rigid, construction for load path distribution throughout the thrust reverser cascade element and which is relatively light in weight.

The thrust reverser may comprise for example a single thrust reverser cascade element, or more preferably two or more thrust reverser cascade elements.

The invention enables the thrust reverser cascade element to be easily produced with different vane sizes and/or different vane angles. The invention allows the scaling of any design to different sizes. The invention does not require the use of complex tooling/moulds, it only requires tooling to facilitate bending of one of the pieces of sheet material. It enables the thrust reverser cascade elements to be produced in less time and at less cost compared to the prior art and enables the thrust reverser cascade element to be assembled by unskilled workforce.

Although the invention has been described with reference to a thrust reverser cascade element, the invention is equally applicable to other flow directing elements on a gas turbine engine and flow directing elements for other applications. The flow directing element may be for directing a gaseous flow or a liquid flow.

Although the invention has been described with reference to the use of twist locks, any other suitable fastening locating device may be used to fasten the sheet metal pieces together.

Although the invention has been described with reference to a ductile sheet material with a plurality of transversely spaced apertures and a plurality of longitudinally spaced apertures it may be possible to use a ductile sheet material with only a plurality of longitudinally spaced apertures or a ductile sheet material with only transversely spaced apertures.

We claim:

1. A method of manufacturing a flow directing element comprising the steps of:
   (a) forming a plurality of pairs of plates, the plurality of pairs of plates being formed from sheet material,
   (b) forming a single integral piece of ductile sheet material such as to form a plurality of flow directing vanes, forming a plurality of spaced apart apertures and a plurality of sheet material portions in the integral piece of ductile sheet material,
   (c) arranging the single integral piece of ductile sheet material, such that at least one vane extends between each pair of plates and each sheet material portion defines one of the plurality of flow directing vanes, said pair of plates having ends extending in spaced apart planes and each said vane extending at an angle to one of said planes.

2. A method as claimed in claim 1, wherein step (c) further comprises arranging the single integral piece of ductile sheet material, such that a plurality of vanes extend between each pair of plates.

3. A method as claimed in claim 1 comprising forming the single integral piece of ductile sheet material from a metal.

4. A method as claimed in claim 1 comprising forming the plates from a metal.

5. A method as claimed in claim 1, wherein step (b) comprises forming the spaced apertures by cutting with a laser beam.

6. The method as claimed in claim 1 wherein the plates have longitudinally extending edges, the sheet material portions being arranged in planes at about 45 degrees to the longitudinally extending edges of the plates and the apertures being arranged in planes at about 90 degrees to the longitudinally extending edges of the plates.

7. A method of manufacturing a flow directing element comprising the steps of:
   (a) forming a plurality of pairs of plates, the plurality of pairs of plates being formed from sheet material,
   (b) forming a single integral piece of ductile sheet material such as to form a plurality of flow directing vanes, forming a plurality of spaced apart apertures and a plurality of sheet material portions in the integral piece of ductile sheet material, (c) arranging the single integral piece of ductile sheet material, such that at least one vane extends between each pair of plates and each sheet material portion defines one of the plurality of flow directing vanes, said pair of plates having ends extending in spaced apart planes and each said vane extending at an angle to one of said planes wherein step (b) further comprises forming a plurality of longitudinally spaced apart apertures in the single integral piece of ductile sheet material and forming a plurality of longitudinally spaced apart sheet material portions between the apertures and bending the ductile sheet material at a plurality of longitudinally spaced positions such that each sheet material portion defines one of the plurality of flow directing vanes.

8. A method of manufacturing a flow directing element comprising the steps of:
(a) forming a plurality of pairs of plates, the plurality of pairs of plates being formed from sheet material,
(b) forming a single integral piece of ductile sheet material such as to form a plurality of flow directing vanes, forming a plurality of spaced apart apertures and a plurality of sheet material portions in the integral piece of ductile sheet material,
(c) arranging the single integral piece of ductile sheet material, such that at least one vane extends between each pair of plates and each sheet material portion defines one of the plurality of flow directing vanes, said pair of plates having ends extending in spaced apart planes and each said vane extending at an angle to one of said planes wherein step (b) further comprises forming a plurality of longitudinally spaced apart apertures in the single integral piece of ductile sheet material and forming a plurality of longitudinally spaced apart sheet material portions between the apertures and bending the ductile sheet material at a plurality of longitudinally spaced positions such that each sheet material portion defines one of the plurality of flow directing vanes and wherein step (b) comprises forming a plurality of transversely spaced apart apertures in the single integral piece of ductile sheet material, forming a plurality of transversely spaced apart sheet material portions, forming a plurality of longitudinally extending slots between the transversely spaced apart sheet material portions and forming a plurality of transversely extending webs longitudinally between the slots, bending the ductile sheet material at a plurality of longitudinally spaced positions such that each sheet material portion defines one of the plurality of flow directing vanes and step (c) comprises arranging the webs such that they extend over at least one of the plurality of pairs of plates.

9. A method as claimed in claim 8 wherein step (c) comprises forming a plurality of slots in one of the edges of the plates and locating each web in a corresponding one of the slots in the edges of the plates.

10. A method as claimed in claim 8 wherein step (b) comprises forming the longitudinally extending slots by cutting with a laser beam.

11. A method of manufacturing a flow directing element comprising the steps of:
(a) forming a plurality of pairs of plates, the plurality of pairs of plates being formed from sheet material,
(b) forming a single integral piece of ductile sheet material Such as to form a plurality of flow directing vanes, forming a plurality of spaced apart apertures and a plurality of sheet material portions in the integral piece of ductile sheet material,
(c) arranging the single integral piece of ductile sheet material, such that at least one vane extends between each pair of plates and each sheet material portion defines one of the plurality of flow directing vanes, said pair of plates having ends extending in spaced apart planes and each said vane extending at an angle to one of said planes wherein step (b) further comprises forming a plurality of longitudinally spaced apart apertures in the single integral piece of ductile sheet material and forming a plurality of longitudinally spaced apart sheet material portions between the apertures and bending the ductile sheet material at a plurality of longitudinally spaced positions such that each sheet material portion defines one of the plurality of flow directing vanes and wherein step (b) comprises forming a plurality of transversely spaced apart apertures in the single integral piece of ductile sheet material, forming a plurality of transversely spaced apart sheet material portions, forming a plurality of longitudinally extending slots between the transversely spaced apart sheet material portions and forming a plurality of transversely extending webs longitudinally between the slots, bending the ductile sheet material at a plurality of longitudinally spaced positions such that each sheet material portion defines one of the plurality of flow directing vanes and step (c) comprises arranging the webs such that they extend over at least one of the plurality of plates wherein step (a) further comprises forming a plurality of longitudinally spaced apart apertures through the plates, step (b) further comprises forming projections on edges of each longitudinally extending slot in the ductile sheet material and step (c) further comprises locating the projections in a corresponding one of said longitudinally spaced apart apertures formed through the plates.

12. A method of manufacturing a flow directing element comprising the steps of:
(a) forming a plurality of pairs of plates, the plurality of pairs of plates being formed from sheet material,
(b) forming a single integral piece of ductile sheet material having a longitudinally extending edge such as to form a plurality of flow directing vanes, forming a plurality of spaced apart apertures and a plurality of sheet material portions,
(c) arranging the single integral piece of ductile sheet material, such that at least one vane extends between each pair of plates and each sheet material portion defines one of the plurality of flow directing vanes wherein step (b) further comprises forming at least one twist lock on each said longitudinally extending edge of the single integral piece of ductile sheet material and step locating each twist lock in an aperture in one of the plurality of plates.

13. A method of manufacturing a flow directing element comprising the steps of:
(a) forming a plurality of pairs of plates, the plurality of pairs of plates being formed from sheet material,
(b) forming a single integral piece of ductile sheet material such as to form a plurality of flow directing vanes, forming a plurality of spaced apart apertures and a plurality of sheet material portions,
(c) arranging the single integral piece of ductile sheet material, such that at least one vane extends between each pair of plates and each sheet material portion defines one of the plurality of flow directing vanes and further comprising additional step (d) of forming a pair of end plates and step (e) of arranging the end plates to extend it transversely to the plurality of plates and the single integral piece of ductile sheet material.

14. A method as claimed in claim 13, wherein said single integral piece of ductile sheet material includes transversely extending ends and step (b) comprises forming at least one twist lock on each transversely extending end of the single integral piece of ductile sheet material, step (d) comprises forming at least one aperture in each of the end plates and step (e) comprises locating said at least one twist lock in said at least one aperture in one of the end plates.

15. A method as claimed in claim 13, wherein step (a) comprises forming at least one twist lock on each transversely extending ends plate, step (d) comprises forming at least one aperture in each of the end plates and step (e) comprises locating said at least one twist lock in said at least one aperture in the end plates.

16. A method as claimed in claim 13, comprising forming the end plates from a metal.

17. A method as claimed in claim 1, 4 or 16 wherein the metal is selected from the group comprising aluminium, titanium, mild steel and stainless steel.

\* \* \* \* \*